United States Patent Office 3,507,783
Patented Apr. 21, 1970

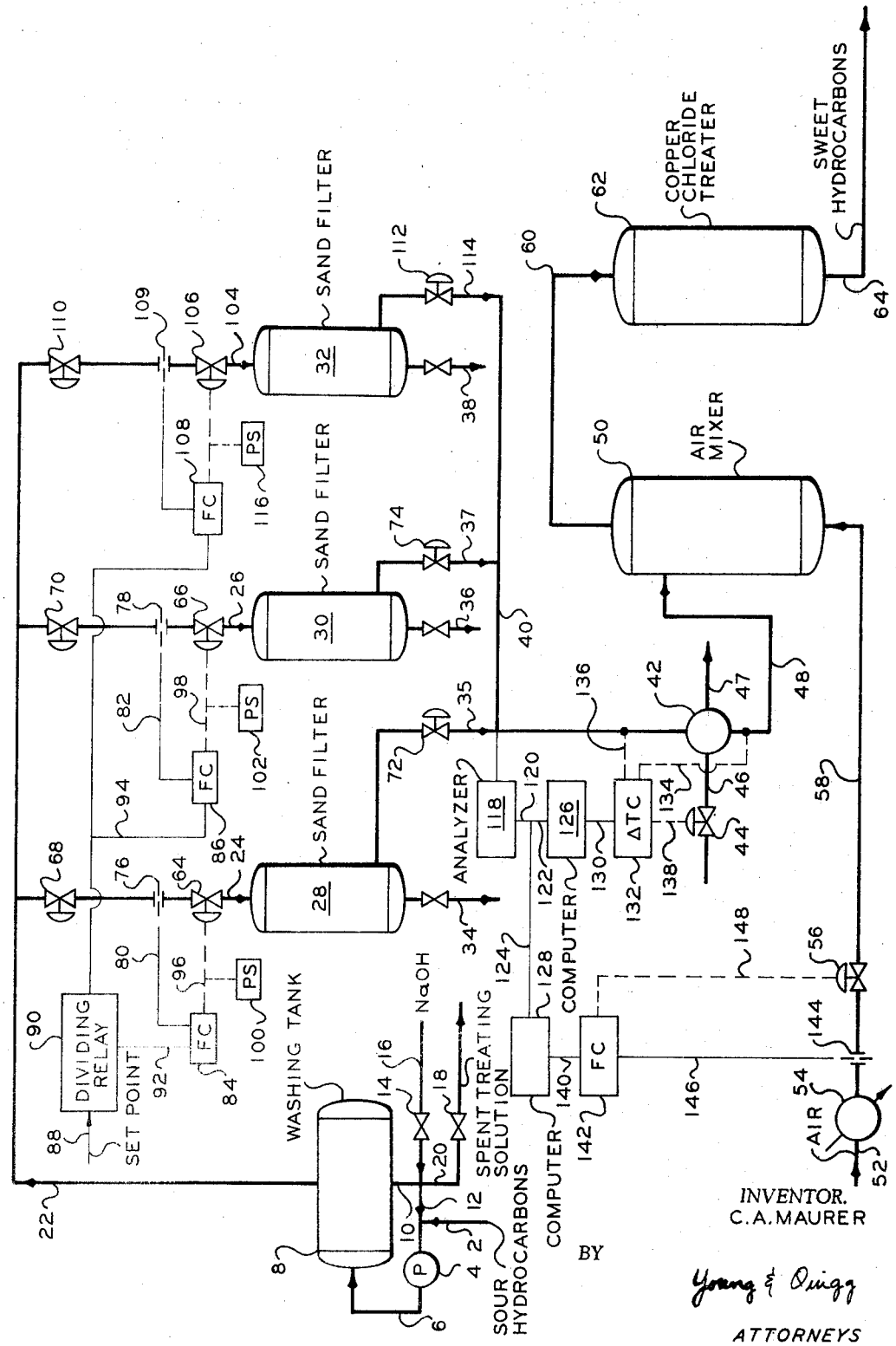

3,507,783
PROCESS FOR SWEETENING
HYDROCARBON OILS
Charles A. Maurer, Sweeny, Tex., assignor to Phillips
Petroleum Company, a corporation of Delaware
Filed Dec. 29, 1967, Ser. No. 694,559
Int. Cl. C10g 27/08
U.S. Cl. 208—195                         8 Claims

ABSTRACT OF THE DISCLOSURE

A process for sweetening mercaptan-containing hydrocarbon streams whereby the life of the cupric chloride reagent is increased including the steps of determining the mercaptan concentration in the hydrocarbon stream, and controlling the addition of heat to the stream so as to increase the water-absorption capacity thereof, and controlling the quantity of an oxygen-containing gas admixed with the hydrocarbon stream necessary to maintain the sweetening reagent active, as a function of this mercaptan concentration.

---

This invention relates to the refining of hydrocarbon fluids. In another aspect this invention relates to an improved method for the sweetening of "sour" petroleum hydrocarbon products.

Various separated but otherwise unrefined petroleum hydrocarbon streams, such as natural gasoline, refinery straight run and cracked gasoline, petroleum solvent naphthas, liquefied gases, kerosenes, and the like, frequently contain mercaptans which give the refined products undesirable odors and render them corrosive and unstable. These petroleum hydrocarbon products containing mercaptans are commonly termed "sour." Various treatments, commonly referred to as sweetening processes, are used to partially or entirely convert the mercaptans to less harmful disulfides or to completely remove the mercaptans. The processes chosen and the results obtained are generally dependent upon the specific mercaptans present.

One commonly used process includes the steps of washing the sour hydrocarbon stream by contacting with an alkali metal polysulfide and/or hydroxide solution to remove a substantial portion of the sulfur compounds present, passing the washed hydrocarbon stream through a sand filter to remove any washing solution or other deleterious material carried over from the washing step, then treating the washed and filtered hydrocarbon stream by contacting same with a solid copper halide treating agent to convert substantially all of the remaining sulfur compounds to disulfides.

In this type of process the copper halide solid treating agent comprises a highly porous or adsorbent material such as fuller's earth, charcoal, or the like, impregnated with a reagent comprising a concentrated solution of cupric chloride or other cupric halide, or of a water-soluble cupric salt, such as cupric sulfate, and a halide such as sodium chloride.

The "sour" hydrocarbon stream is passed through the reagent bed in its liquid state together with dissolved oxygen-containing gas and the mercaptans contained therein react with the copper halide-containing reagent as follows:

(1)    4 $CuCl_2$ (cupric chloride)
            +4R—SH (mercaptan)
           →2R—S—S—R (alkyl disulfide)
           +4 CuCl (cuprous chloride)
                        +4HCl (hydrochloric acid)

From this reaction it can be seen that the mercaptans are converted to less objectionable disulfides while the cupric compound is reduced to the cuprous state and hydrochloric acid is formed. Also, this reaction shows that the mols of cuprous chloride formed is directly proportional to the mols of mercaptans converted. Since cuprous chloride and hydrochloric acid are formed in the reaction at the expense of cupric chloride, the reagent will gradually lose its activity and finally become spent.

In order to maintain the activity of the copper-containing reagent, it is necessary to add a sufficient quantity of oxygen, by contacting the hydrocarbon stream with air or other gas containing free oxygen prior to its passage over the reagent, to regenerate the spent reagent according to the reaction:

(2)    4CuCl (cuprous chloride)
            +4HCl (hydrochloric acid)
            +$O_2$ (oxygen)
          →4$CuCl_2$ (cupric chloride)
                       +2$H_2O$ (water)

Thus when oxygen is in solution with the hydrocarbon material at the time of sweetening, the above reactions occur simultaneously and the reagent is maintained in an active state.

The water formed by the maintenance of the reagent in the active state, when carried out of the reagent bed by the product stream, tends to saturate and dissolve the reagent, and frequently system shutdowns are required so that the reagent may be properly dehydrated. In attempting to overcome the water build-up problem, it has been common practice to preheat the filtered feed stream at some point upstream of the copper halide treating step. The preheating increases the capacity of the feed stream to dissolve water therein so that it will tend to dissolve more of the water of reaction and to carry same out of the reagent tower.

From the reactions above, it can be seen that the concentration of oxygen to be added to the sour hydrocarbon stream to maintain the reagent in an active state and the water formed is directly proportional to the concentration of mercaptans in that stream. In order to maximize the life of the reagent and the efficiency of operation, it is desirable to maintain close control of the oxygen addition rate so that a sufficient quantity is added to maintain the reagent active yet prevent addition of an excessive quantity so that the vapor pressure of the hydrocarbon is not adversely increased. For the same reasons, it is also desirable that the heat input to the hydrocarbon stream be closely controlled so that the stream is sufficiently heated to dissolve the water of reaction from the copper halide treating step yet not incurring the cost of adding unnecessary heat and over-dehydrating the copper halide.

Accordingly, an object of this invention is to provide an improved and economical copper sweetening process.

Another object of this invention is to provide a method and means for improving the operation of a copper sweetening process so that the life of the reagent is increased.

Other objects, advantages and aspects of this invention will become apparent to those skilled in the art from the following detailed description, drawing and appended claims.

According to this invention, there is provided, in a sour hydrocarbon sweetening process, a method for controlling the rate of addition of oxygen into the sour hydrocarbon stream comprising determining the mercaptan concentration in said stream and controlling the flow of oxygen responsive to this determination. Also in accordance with this invention, the flow of heat exchange medium passing in heat exchange relationship with the sour hydrocarbon stream is controlled responsive to this determination of the mercaptan concentration. Further, according to this invention, method and apparatus are provided for automatically equalizing the flow of sour hydrocarbons through a plurality of said filters and transferring a portion of the flow to a fresh filter when the pressure drop through one of the filters becomes excessive.

Reference is made to the drawing, which is a diagrammatic representation of a copper sweetening process embodying this invention, for a better understanding of the invention. A sour hydrocarbon feed is introduced into the system through line 2. This feed can be a single mercaptan-containing hydrocarbon stream or a mixture of two or more refinery streams, such as natural gasoline and straight run gasoline fractions. The feed is passed through pump 4 and line 6 into washing tank 8. In pump 4, line 6 and washing tank 8, the feed is intimately contacted with an aqueous solution of alkali metal polysulfide, preferably sodium polysulfide, at a temperature within the range of about 60 to 150° F., preferably 80 to 120° F., to remove a substantial portion of the undesirable sulfur compounds present in the feed.

The polysulfide treating solution employed can be prepared in any of the well known methods. Generally, the concentration of sodium sulfide present in the treating solution ranges from 4 to 6 weight percent, while the concentration of sodium hydroxide in the solution ranges from 8 to 12 weight percent; however, concentrations outside these ranges can be used with satisfactory results. Pressure utilized during the contacting step are normally atomspheric; however, elevated pressures can be employed if desired.

A solution of sodium polysulfide and sodium hydroxide in water removed from wash tank 8 through line 10 is mixed with the feed in line 12 and passed through pump 4 wherein intimate mixing occurs. Washing tank 8 is of sufficient capacity to allow sufficient residence time for separation by gravity of the contacted feed from the aqueous sodium polysulfide solution. In practice, a plurality of washing tanks may be required to obtain this capacity for the volume of sour hydrocarbon being processed. The intimate mixing obtained in pump 4 and line 6 serves to remove hydrogen sulfide, mercaptans and the like from the sour hydrocarbon feed and causes the solution thereof in the aqueous sodium polysulfide solution. Valve 14 is provided for the addition of sodium hydroxide through line 16 and valve 18 in line 20 is provided for the removal of spent treating solution.

The treated stream of hydrocarbon is withdrawn from washing tank 8 via line 22 and passed through lines 24 and 26 to sand filters 28 and 30 wherein at least a portion of any treating agent or other deleterious material carried over with the hydrocarbon stream, including free or entrained water associated therewith, is coalesced and removed. Sand filter 32 is a spare which is used as discussed hereinafter. Two operating filters are shown; however, three or more may be required for high volume processing. Aqueous phase which has been removed from the hydrocarbon stream can be removed from the sand filters 28, 30, and 32 through lines 34, 36, and 38, respectively.

The filtered stream of hydrocarbon is passed from the sand filters 28 and 30 through lines 35, 37, and 40 to heat exchanger 42 which can comprise a bank of exchangers in practice.

As the stream passes through heat exchanger 42, its temperature is increased to a level where the moisture-absorbing potential is sufficient to dissolve the water produced in the copper halide treating step. The temperature of the stream is generally substantially that of the atmosphere. As it passes through heat exchanger 42 it is raised to a temperature between about 100 and about 150° F. The heat input to effect this temperature increase is controlled in response to the total mercaptan content in the stream of hydrocarbons, as described hereinafter, by manipulation of valve 44 disposed in line 46 through which exchange medium, such as steam or a heated oil stream, is introduced into heat exchanger 42.

The heated stream passes from heat exchanger 42 to air mixer 50 via line 48. Air passing through line 52, cooler 54, valve 56, and line 58, is introduced into air mixer 50 and contacted therein with the hydrocarbon stream. Cooler 54 condenses and separates any condensable water from the incoming air thereby eliminating the addition of unwanted water to the copper halide treating step from this source. The rate of air addition to air mixer 50 is controlled by valve 56 in response to the total mercaptan content in the sour hydrocarbon stream as discussed hereinafter. Generally, the minium quantity of air supplied to the mixer necessary to maintain the activity of the copper reagent is about 1 cubic foot of air per barrel of sour oil per 0.01 weight percent of mercaptans in the sour oil.

The heated, air-contacted hydrocarbon stream is passed from air mixer 50 and is introduced via line 60 into copper chloride treater 62 wherein the reactions described above take place. Sweetened hydrocarbon is removed from copper chloride treater 62 and is directed to further processing, such as fractionation, blending, and removal of dissolved water, and/or to storage through line 64.

The system is essentially liquid-full so the total flow of feed passing through line 2 will pass through filters 28 and 30. Valves 64 and 66 in lines 24 and 26 control the flow to sand filter 28 and 30. Inlet valve 68 disposed in line 24, inlet valve 70 disposed in line 26, outlet valve 72 disposed in line 35, and outlet valve 74 disposed in line 37 are shut off valves which are used to switch among the various filters as described hereinafter.

I have found that the effectiveness of the sand filters can be increased by dividing the stream of hydrocarbon flowing through line 22 among the operating filters so that substantially equal rates of flow are directed to each of the filters. Flow measuring elements 76 and 78, such as turbine meters, disposed in lines 24 and 26, measure the flow in each respective line and a signal representative of the measured flow therein is transmitted via conventional instrumentation transducers (not shown) and signal lines 80 and 82 to flow controllers 84 and 86. Setpoint 88 of dividing relay 90 is adjusted to a value corresponding to the desired total flow rate of sour hydrocarbon feed through line 22, hence the total flow through line 2. Dividing relay 90 divides this setpoint value by a number corresponding to the number of operating sand filters, e.g. divides the setpoint by 2 for the system shown in the drawing, and the quotient is transmitted as the common setpoint to individual flow controllers 84 and 86 through signal lines 92 and 94, respectively, thus apportioning the flow among the operating sand filters. Dividing relay 90 is a conventional Sorteberg force bridge such as described in Minneapolis Honeywell Catalogue No. C80-1 of September 1956.

Flow controllers 84 and 86 manipulate valves 64 and 66, in response to the difference between the measured flow and the setpoint value, by output signals transmitted via control lines 96 and 98, respectively. These output signals are (if all pneumatic) air pressure signals ranging from 3 to 15 p.s.i. with the upper limit corresponding to the control valves 64 and 66 being fully open. Valves 64 and 66 are manipulated toward the fully open position as the pressure drop across the sand filter increases from the accumulation of filtered-out materials. As these filters become "loaded" to the point that the pressure drop becomes excessive, heretofore, the procedure generally followed was to wash and reuse the sand. I have found that the effectiveness of the system can be increased and the operation made more economical by recharging the filter with new sand. The cost of the new sand is overridden by the increased effectiveness of the filtering action, which in combination with the control features of this invention, increases the useful life of the copper halide reagent.

Pressure actuated switching devices 100 and 102, operably connected to control lines 96 and 98, respectively, are set to respond at 15 p.s.i., which is equivalent to the control valves 64 and 66 being actuated to the fully open position thereby indicating that the pressure drop across the sand filter has become excessive. If desired, these switches can be used to initiate conventional alarm devices which give an audible and/or visual indication.

Filter 32 is connected to line 22 by line 104 and has the same control devices as sand filters 28 and 30. The flow through line 104 is controlled by valve 106 which is manipulated by flow controller 108 responsive to flow measurement from element-transmitter 109 in the same manner as described in connection with sand filters 28 and 30. Valve 110, disposed in line 104, and valve 112, disposed in line 114, are closed when filter 32 is acting as a spare. Sand filter 32 is provided as a spare so that as the pressure drop across one of the operating sand filters becomes excessive the flow through the "loaded" filter can be directed to the spare filter and the "loaded" filter can be recharged with new sand. The recharged filter then becomes a spare until another filter becomes "loaded." For example, if filter 28 becomes loaded, as indicated by pressure switching device 100, inlet valve 68 and outlet valve 72 are closed and inlet valve 110 and outlet valve 112 are opened.

In accordance with one embodiment of this invention, this switchover is performed manually when one of the pressure-actuated switching devices indicates an excessive pressure drop. A switch (not shown) is manually actuated to interrupt the output signal from dividing relay 90 to the corresponding flow controller and the output signal is directed to the flow controller associated with the spare filter. The inlet and outlet valves of the "loaded" filter are closed and the inlet and outlet valves of the spare filter are opened. This switchover mechanism can be any conventional electrical or pneumatic system.

In accordance with another embodiment of this invention, the switchover is performed automatically. Pressure switching devices 100, 102, and 116 are connected into a conventional electrical system so that when one is actuated indicating that the corresponding sand filter is "loaded," the inlet and outlet valves of the "loaded" filter, which are solenoid-operated, are actuated closed and the inlet and outlet valves of the spare filter are actuated open. Also, the output signal from dividing relay 90 to the flow controller associated with the "loaded" filter is interrupted and is transferred to the flow controller associated with the spare filter.

A total mercaptan analyzer 118, such as a Titrilog, Type 26–102, described in Bulletin 1305 of Consolidated Electrodynamics Corp., Pasadena, Calif., samples the hydrocarbon stream flowing through line 40, and determines the total mercaptan concentration therein and a signal representative of this concentration is transmitted via signal line 120. The output signal from analyzer 118 is transmitted in common via signal lines 122 and 124 to pneumatic computers 126 and 128, respectively. Each of these pneumatic computers is a conventional function-fitting device, such as a Foxboro Company M–56 Adding Relay employed as an analog computer. This relay is described in Foxboro Brochure 37–57A of Sept. 12, 1956.

Pneumatic computer 126 determines the temperature increase required in the hydrocarbon stream, based on the mercaptan concentration therein, to effect the moisture absorption capacity necessary to dissolve the water formed in the copper chloride treater and transmit a signal representative thereof via signal line 130 as a setpoint to differential temperature controller 132. Temperature sensing devices, such as thermocouples (not shown), disposed in lines 40 and 48, measure the temperature of the stream entering and leaving heat exchanger 42 and transmit signals representative thereof to differential temperature controller 132 via signal lines 134 and 136. Differential temperature controller 132 compares the actual differential temperature between the streams entering and exiting heat exchanger 42 with its setpoint value and manipulates valve 44 on the heating media conduit 46 via control line 138 in response to this comparison.

The hydrocarbon stream in line 40, which has been washed with an aqueous solution and filtered, is essentially water-saturated at the temperature existing in line 40. For this reason differential temperature control is employed to add, by way of heating the stream, the moisture absorbing capacity needed to dissolve the additional concentration of water formed in the copper chloride treater which corresponds chemically to the mercaptan concentration in the hydrocarbon stream. In this manner the amount of heat added to the stream is precisely controlled to insure that the desired temperature increase is achieved so that the hydrocarbon stream can dissolve the water formed in the copper chloride treater while preventing the addition of an unnecessary amount of heat. An excessive temperature rise in the hydrocarbon stream would cause over-dehydration of the copper chloride thereby impairing its activity and life.

Pneumatic computer 128 determines the concentration of air required to provide a sufficient concentration of oxygen in the hydrocarbon stream to maintain the copper chloride reagent active (in the cupric form) based upon the mercaptan concentration in the hydrocarbon stream in line 40 in accordance with the above reactions and transmits a signal representative thereof via signal line 140 as the setpoint to flow controller 142. A flow measuring element 144 such as a rotometer, disposed in line 58, measures the rate of flow of air therein and a signal representative thereof is transmitted via conventional instrumentation transducers (not shown) and signal line 146 to flow controller 142. Flow controller 142 manipulates valve 56 by an output signal transmitted via line 148 in response to the difference between the measured flow and the setpoint value. In this manner the rate of air addition is precisely controlled to provide sufficient oxygen to maintain the copper chloride reagent active while the addition of excessive air is prevented.

EXAMPLE

In a system where debutanized natural gas liquids and straight run gasoline streams are blended and treated with a treating system the following conditions will exist when the mercaptan concentration in the combined stream is 0.030 (Run 1) and 0.035 (Run 2) weight percent.

|  | 1 | 2 |
|---|---|---|
| Combined stream feed (line 2), barrels/hr | 1,600 | 1,600 |
| Temperature of stream (line 40), °F | 80 | 80 |
| Mercaptan concentration (line 40), wt. percent | 0.030 | 0.035 |
| Temperature of heated stream (line 48), °F | 120 | 128 |
| ΔT Increase in heat exchanger (42), °F | 40 | 48 |
| Air flow rate (line 58), ft.³/hr | 4,800 | 5,600 |

An operational system for treating blended debutanized natural gas liquids and straight run gasoline streams containing a mercaptan concentration in the range of 350 to 375 p.p.m. and being charged at 38,400 barrels per day was operated substantially in accordance with this invention. A comparison of the operation of the system with the features of this invention incorporated with a conventional system not using the features of this invention showed that the average life of the copper chloride reagent was increased from 259,400 to 577,333 barrels throughput of sour hydrocarbon, an increase of nearly 128 percent which corresponds to a 55 percent reduction in cost per barrel for the treating.

As will be evident to those skilled in the art, various modifications and alterations can be made to this invention in view of the foregoing disclosure without departing from the spirit or scope thereof.

I claim:

1. In a process for sweetening mercaptan-containing hydrocarbons wherein a heated mercaptan-containing hydrocarbon stream is admixed with an oxygen-containing gas and contacted with a sweetening reagent comprising an adsorbent material impregnated with a solution containing cupric ions and chloride ions, to thereby convert the mercaptans in said hydrocarbon stream to disulfides while continually regenerating said reagent and forming water, the improvement comprising measuring the mercaptan concentration in said hydrocarbon stream and producing a signal representative of said mercaptan concentration, adding sufficient heat in controlled quantity to said hydrocarbon stream in response to said signal so as to maintain the water absorption capacity of said hydrocarbon stream at a level sufficient to absorb the water formed in said contacting step, and admixing said oxygen-containing gas in controlled quantity with said hydrocarbon stream in response to said signal so as to provide sufficient oxygen to continuously regenerate said reagent.

2. The process according to claim 1 wherein said oxygen-containing gas is air.

3. The process according to claim 2 wherein substantially all the condensable water is removed from said air prior to admixing with said hydrocarbon stream.

4. A process according to claim 1 wherein there are included preliminary steps comprising contacting said hydrocarbon stream with an aqueous sodium polysulfide solution, separating said contacted hydrocarbon stream from said sodium polysulfide solution, and passing said hydrocarbon stream through a filter zone comprising a plurality of sand beds.

5. The process of claim 4 wherein said hydrocarbon stream is divided upstream of said filter zone, and each resulting subdivided stream is passed through a separate sand bed in said filter zone, the flow of each subdivided stream through its respective sand bed being controlled so as to maintain substantially equal flow through the separate sand beds.

6. The process of claim 4 wherein a first signal representative of the total flow of said hydrocarbon stream to said filter zone is produced, said first signal being divided to produce a second signal representative of the desired flow to each sand bed, said desired flow being equal to said total flow divided by the number of sand beds in use, and controlling the flow of hydrocarbon to each sand bed responsive to said second signal.

7. The process of claim 5 wherein the pressure differential in each said subdivided stream across its respective sand bed is measured, and a signal representative of a predetermined pressure differential is produced when said measured pressure differential is equal to said predetermined pressure differential; said signal thereupon causing the termination of flow of said subdivided stream to its respective sand bed and causing the initiation of flow of said subdivided stream to another sand bed having fresh sand.

8. Apparatus for controlling the heat supplied to and the amount of an oxygen-containing gas admixed with a mercaptan-containing hydrocarbon stream as a function of the mercaptan concentration therein comprising heat exchange means having a first conduit means for introducing said hydrocarbon stream thereto; a second conduit means for introducing a heating medium into said heat exchange means and passing same in indirect heat exchange relationship with said hydrocarbon stream; mixing means for contacting an oxygen-containing gas with said hydrocarbon stream; a third conduit means connecting said heat exchange means with said mixing means through which said hydrocarbon stream flows; a fourth conduit means for introducing said oxygen-containing gas into said mixing means; analyzing means for measuring the mercaptan concentration in said hydrocarbon stream passing through said first conduit means and producing a first signal representative thereof; first and second control valve means disposed in said second and fourth conduit means, respectively; means for converting said first signal to a second signal representative of the temperature increase of said hydrocarbon stream desired as a function of the mercaptan content therein; means for measuring the difference in temperature in said hydrocarbon stream upstream and downstream of said heat exchange means and producing a third signal representative thereof; means for comparing said second signal with said third signal and producing a first control signal representative of the difference therebetween; means operatively connected to said first control valve for manipulating same responsive to said first control signal; means for converting said first signal to a fourth signal representative of the amount of oxygen-containing gas desired to be added to said hydrocarbon stream as a function of the mercaptan concentration therein; means for measuring the flow of said oxygen-containing gas through said fourth conduit means and producing a fifth signal representative thereof; means for comparing said fourth signal with said fifth signal and producing a second control signal representative of the difference therebetween; and means operatively connected to said second control valve for manipulating same responsive to said second control signal.

References Cited

UNITED STATES PATENTS

| | | | |
|---|---|---|---|
| 2,228,041 | 1/1941 | Yabroff et al. | 208—195 |
| 2,773,009 | 12/1956 | Earhart et al. | 208—190 |
| 3,052,625 | 9/1962 | Gordon et al. | 208—190 |
| 3,305,479 | 2/1967 | Grutsch et al. | 208—195 |

DELBERT E. GANTZ, Primary Examiner

G. J. CRASANAKIS, Assistant Examiner

U.S. Cl. X.R.

23—253